(No Model.)
E. W. TALBOTT.
RUBBER DENTAL PLATE.
No. 377,177. Patented Jan. 31, 1888.
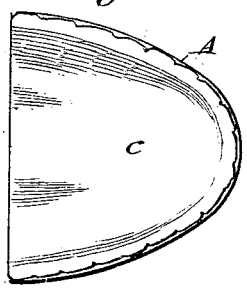
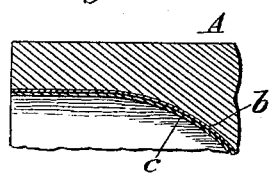
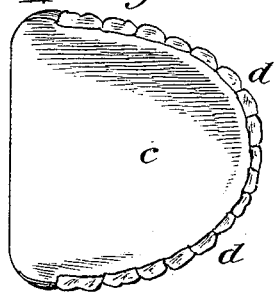
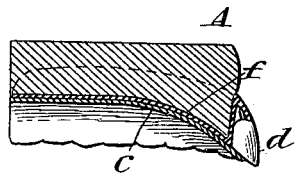
WITNESSES:
INVENTOR:
E. W. Talbott
BY Munn &Co
ATTORNEYS.

UNITED STATES PATENT OFFICE.

EZRA W. TALBOTT, OF NAPOLEON, OHIO, ASSIGNOR OF ONE-HALF TO ANDREW T. SHERMAN, OF SAME PLACE.

RUBBER DENTAL PLATE.

SPECIFICATION forming part of Letters Patent No. 377,177, dated January 31, 1888.

Application filed November 25, 1887. Serial No. 256,107. (No model.)

*To all whom it may concern:*

Be it known that I, EZRA W. TALBOTT, of Napoleon, in the county of Henry and State of Ohio, have invented a new and useful Improvement in the Manufacture of Rubber Dental Plates, of which the following is a full, clear, and exact description.

This invention relates to the manufacture of upper dental plates made of rubber.

To more clearly explain the nature and objects of my improvement, I will first briefly refer to the process as heretofore or ordinarily pursued in the manufacture of these dental plates.

The dentist first takes an impression of the mouth and from the impression makes a model of plaster-of-paris. Upon this model a sheet of beeswax or of gutta-percha, suitably warmed, is placed. This constitutes what is known as the "base-plate." The teeth are then placed in position upon said base-plate and model and held in position by beeswax. The model is next placed in the lower half of a flask and fastened with plaster-of-paris, after which the upper half of the flask is placed upon the lower half thereof and filled with plaster-of-paris. After the plaster has set or become hard the two halves of the flask are separated and the base-plate of beeswax or gutta-percha removed, and the rubber of which the dental plate is to be made is packed in its place. Vulcanization is the next step in the process, and after this is effected the sections of the flask are separated and the finishing of the plate is begun. This finishing is done by means of scrapers, files, lathes, sand-paper, polishing-wheels, powders, and other materials or instruments, and usually requires from one hour to two or more hours for each plate.

The object of my invention is to do away with this labor, to economize the rubber, and to effect a more perfect result; and the invention mainly consists in the use of what may be termed "two plates" in the course of manufacturing and finishing the rubber dental plate, substantially as hereinafter described.

Reference is to be had to the accompanying drawings, forming a part of this specification, in which similar letters of reference indicate corresponding parts in all the figures.

Figure 1 represents an under view of a plaster model for an upper rubber dental plate, with a paper base-plate and metallic finishing-plate used in my invention thereon, but omitting the teeth. Fig. 2 is a vertical longitudinal section of the same. Fig. 3 is an under view of said model with teeth in position and with the metallic finishing-plate and the rubber which takes the place of the paper base-plate in place, and Fig. 4 is a vertical longitudinal section of the same.

My method of proceeding to produce and finish the rubber upper dental plate is as follows: First, I take an impression of the mouth and produce a model, A, as before, and then place the teeth in position on the model and secure by wax. A piece of blotting-paper, *b*, is then cut the desired size, dipped in water, and placed upon the palate of the model, the same extending up far enough to cover the pins of the teeth. This paper, which is the base or trial plate, being wet, will conform to the rugae on the model or mouth. A piece of heavy tin-foil, *c*, cut the proper size, is then placed upon this blotting-paper base-plate on the model and burnished thereon by means of a suitable steel or other instrument. This tin-foil constitutes the metallic finishing-plate, which is allowed to extend to and cover the crown of the teeth *d*. The model is then placed in the lower half of the flask and fastened with plaster-of-paris. A strip of metallic finishing-plate (tin-foil) is cut and placed around the entire outer surface of the teeth, extending from the crown part down to the plaster-of-paris in the lower half of the flask. The upper half of the flask is next placed upon the lower half and filled with plaster-of-paris, and when the latter is set the flask is separated and the paper base-plate *b* removed and the metallic finishing-plate *c* allowed to remain on the half containing the teeth, the same covering the entire surface of the plaster-of-paris. Rubber is placed in small pieces around the pins of the teeth, and a piece, *f*, of rubber, the size of the paper base-plate *b*, is placed upon the model A. (See Fig. 4.) The two halves of the flask are then put together, the metallic finishing-plate *c* coming in contact with the lingual, buccial, and labial portion of the rubber. The blotting or other like paper I find the most suitable material of which to form the base-plate. When I place the paper base-plate wet upon the model and put the metallic finishing-plate upon it, I get the rugaes of the mouth upon said metallic plate, and when the paper base-plate is removed the metallic finishing-plate is the same thickness as it was originally. Wax would not answer on this account, inasmuch as it would not remain the same thickness under a burnishing-tool; neither is it as cheap.

It often happens that a dentist, in scraping and filing a plate, gets it too thin in some portions and renders it worthless or causes a great deal of extra trouble and work to remedy such defect. My invention obviates this danger, as by means of it there is no scraping or sandpapering required.

The results of my invention are, first, the saving of time and labor; second, the making of a dental rubber plate of uniform thickness; third, a denser packing of the rubber; fourth, the closing of all the porous places in the plate; fifth, the production of a smoother rubber plate and giving it a finer and better finish; sixth, the dental plate is finished inside the vulcanizer; seventh, less rubber is used and a better plate produced, due to the denser packing of the rubber around the pins of the teeth, thus preventing them from working loose or coming out; eighth, a dental plate is produced with the rugae on the lingual side of the plate, which is a novelty; ninth, a more elastic rubber dental plate is produced, owing to its not being weakened by scraping, sandpapering, or otherwise equivalently finishing the plate.

Having thus described my invention, what I claim as new, and desire to secure by Letters Patent, is—

In the manufacture of rubber dental plates, the combination of the paper base-plate and metallic finishing-plate for use in connection with each other, with the model made from an impression of the mouth, and with the rubber of the dental plate, substantially as and for the purposes specified.

EZRA W. TALBOTT.

Witnesses:
MARTIN KNAPP,
H. H. FRENCH.